Aug. 17, 1926.
T. MUNRO
1,596,290
SPRING HANGER COVER
Filed April 2, 1926
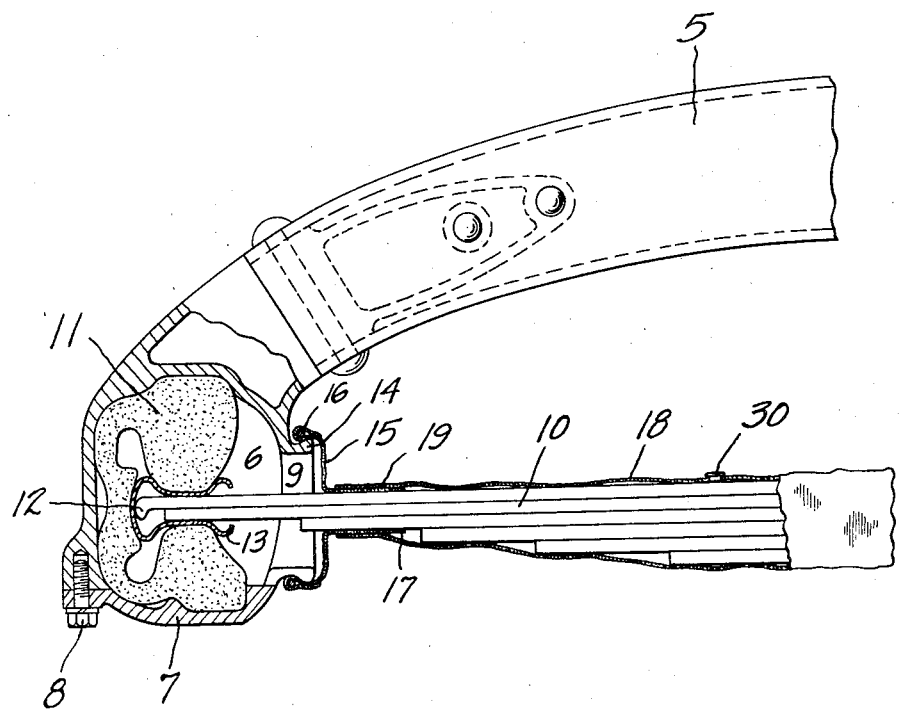
Inventor
THOMAS MUNRO
By *Hing Harness*
Attorney Patented Aug. 17, 1926.

1,596,290

UNITED STATES PATENT OFFICE.

THOMAS MUNRO, OF PHILADELPHIA, PENNSYLVANIA.

SPRING-HANGER COVER.

Application filed April 2, 1926. Serial No. 99,245.

In the construction of automobiles it has become customary in some cases to mount the chassis springs of the automobiles in rubber or other flexible block constructions as distinguished from spring shackle mountings. The nature of the rubber or other flexible block mountings is such that serious damage is done thereto by the admission of foreign matter within the housing therefor because of the tendency of such foreign matter to disintegrate the block. It has been proposed to provide a cover for the opening in the block housing through which the spring extends so as to prevent the entry of foreign matter into the housing. Such covers have been combined with a cover for the spring itself.

In the event it is desired to lubricate the spring proper by the insertion of lubricant within the spring cover it becomes possible for the lubricant within the housing to pass into the block housing supporting the end of the spring. Such lubricant has a detrimental effect upon the rubber or other flexible blocks utilized in the housing.

It is therefore the primary object of my invention to provide a cover for the opening in the block housing which shall extend from the opening to and around the spring itself but shall there terminate. I then provide the conventional spring cover for the spring proper, the ends of which shall be disposed around the ends of the housing cover so as to secure them in place and at the same time prevent the entry of lubricant from the spring cover to the block housing.

With the above and other objects in view my invention consists in the arrangement, combination and construction of the various parts of my improved device, as described in the specification, claimed in my claims and shown in the accompanying drawing, in which:

The single figure is a side elevation of one end of a vehicle frame, parts being broken away to show in section a rubber block mounting on the end of the frame, a conventional spring being mounted in the block connection, with my improved covers arranged on the spring proper and block housing.

I have shown one end of a vehicle frame 5 having secured to its end a chamber or housing 6 adapted to be closed by a cap 7 secured in place by studs 8. An opening to the atmosphere from the chamber or housing 6 is shown at 9 and a leaf spring 10 extends through said opening and is mounted in a conventional rubber block 11 provided in the chamber or housing 6. The end of one of the leaves of the spring 10 is bent in the conventional manner at 12 and a conventional metallic retainer and bearing member 13 encloses the end of the spring 10 so that when the block 11 is compressed by securing the cap 7 in place, the end of the spring is securely held within the chamber or housing 6.

The edge of the opening 9 is flanged as at 14 and one end of a cover 15 is secured in place by the flange 14, a wire 16 being provided in the said end of the cover for tightening the same against the flange 14. The other end of the cover is bent down and around the spring 10 to fit smoothly against the same as at 17. A conventional spring cover 18 is provided around the spring 10 and may be secured in place thereon by spring fasteners, lacing or in any other conventional manner. Lubricant may be introduced around the spring and within the cover 18 through an opening in the cover closed by a cap 30. The end 19 of the spring cover overlies the end 17 of the housing cover so as to secure the end 17 of the housing cover in place and at the same time provide a seal against passage of any lubricant which may be within the spring cover 18 to the chamber 6.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In a device of the class described, a spring hanger housing, a vehicle spring having one of its ends anchored in said housing, a flexible cover on said spring, and a second cover sealing said housing.

2. In combination, a motor vehicle frame, a housing connected to said frame, an opening in said housing, a spring extending through said opening into said housing, a cover on said spring, a second cover anchored on said housing and extending over said spring.

3. In combination, a spring hanger housing having an opening therein, a spring having one end extended through said opening into said housing, a cover having one edge secured on said housing around said opening and another edge disposed around said spring, to seal said opening, and a spring cover on said spring enclosing said latter edge of the housing opening cover.

4. In combination, a spring hanger housing having an opening therein, a rubber block in said housing, a spring having one end extended through said opening and anchored in said block, means for closing said opening against the entry of foreign matter into said housing, comprising a cover fitted on said housing around said opening and extended to and around said spring, a cover on said spring fitted around the spring end of said first cover and holding the same snugly around the spring.

THOMAS MUNRO.